US010683850B2

(12) United States Patent
Kim

(10) Patent No.: US 10,683,850 B2
(45) Date of Patent: Jun. 16, 2020

(54) ROTATIONAL FORCE GENERATING DEVICE USING CLOCK SPRING

(71) Applicant: GREENIMT. CO., LTD., Siheung-si (KR)

(72) Inventor: Bu Ja Kim, Siheung-si (KR)

(73) Assignee: GREENIMT. CO., LTD., Siheung-si (KR)

( * ) Notice: Subject to any disclaimer, the term of this patent is extended or adjusted under 35 U.S.C. 154(b) by 0 days.

(21) Appl. No.: 16/085,023

(22) PCT Filed: Dec. 29, 2016

(86) PCT No.: PCT/KR2016/015469
§ 371 (c)(1),
(2) Date: Sep. 14, 2018

(87) PCT Pub. No.: WO2017/159974
PCT Pub. Date: Sep. 21, 2017

(65) Prior Publication Data
US 2019/0093638 A1    Mar. 28, 2019

(30) Foreign Application Priority Data
Mar. 17, 2016 (KR) .......................... 10-2016-0032421

(51) Int. Cl.
*F03G 1/02* (2006.01)
*F03G 1/06* (2006.01)
(Continued)

(52) U.S. Cl.
CPC ................. *F03G 1/06* (2013.01); *F03G 1/02* (2013.01); *F03G 1/08* (2013.01); *F03G 7/08* (2013.01); *F03G 2730/01* (2013.01)

(58) Field of Classification Search
CPC ..... F03G 1/00; F03G 1/02; F03G 1/06; F03G 2730/01; F03G 1/08; F03G 7/08; F16H 3/006; F16H 2003/007; F16H 2003/008
See application file for complete search history.

(56) References Cited

U.S. PATENT DOCUMENTS 1,084,548 A * 1/1914 Johnston, et al. ........ F03G 1/00
185/37
1,312,023 A * 8/1919 Domina .................... F03G 1/00
185/37
(Continued)

FOREIGN PATENT DOCUMENTS

JP     56-098575      8/1981
JP     2002-195149    7/2002
(Continued)

OTHER PUBLICATIONS

WIPO, ISA 210, international Search Report of PCT/KR2016/015469 dated Apr. 13, 2017.
(Continued)

*Primary Examiner* — Alan B Waits
(74) *Attorney, Agent, or Firm* — Lex IP Meister, PLLC

(57) ABSTRACT

Disclosed is a clock spring-based rotational force generating device capable of allowing a user to freely adjust rotation speed of an output shaft and preventing the output shaft from rotating slowly or never rotating due to an weakened unwinding force of a spiral spring in the late period of an operation span of the spiral spring. The device includes an input shaft, a main drive gear receiving the rotational force of the input shaft, a spiral spring wound around a main drive gear shaft, a speed gear to increase the rotational force of the main drive gear, a power transmission control gear sliding up and down to control transmission of the rotational force of the main drive gear to the speed gear, an output shaft outputting the rotational force increased by the speed gear, (Continued)

and a rotation speed control means for controlling the rotation speed of the output shaft.

10 Claims, 15 Drawing Sheets

(51) Int. Cl.
    *F03G 1/08*         (2006.01)
    *F03G 7/08*         (2006.01)

(56)            References Cited

U.S. PATENT DOCUMENTS 1,328,402 A  *  1/1920  Schiffl .................. F03G 1/00
                                                       185/9
    2,844,217 A  *  7/1958  Klosner ................ F03G 1/00
                                                       185/37

FOREIGN PATENT DOCUMENTS

| KR | 10-2001-0077839 | 8/2001 |
| KR | 10-2002-0094611 | 12/2002 |
| KR | 10-0981583 | 9/2010 |

OTHER PUBLICATIONS

WIPO, ISA 220, international Search Report of PCT/KR2016/015469 dated Apr. 13, 2017.
WIPO, ISA 237, international Search Report of PCT/KR2016/015469 dated Apr. 13, 2017.

* cited by examiner

ROTATIONAL FORCE GENERATING DEVICE USING CLOCK SPRING

TECHNICAL FIELD

The present invention relates to a rotational force generating device using a clock spring. More particularly, the present invention relates to a rotational force generating device using a clock spring, the device being capable of allowing a user to freely adjust the rotation speed (revolutions per minute (RPM)) of an output shaft thereof and of preventing the rotation of the output shaft from being stopped due to weakening of the rotational force of the output shaft which is attributable to weakening of an unwinding rotational force of a spiral spring in the second half period of an operation span of the output shaft.

BACKGROUND ART

Examples of rotational force generating means include a motor, a prime mover, and a battery. These rotational force generation means have found their applications in various industrial fields.

In order to operate the rotational force generating means described above, electricity, or a liquid fuel, or a solid fuel is required. Therefore, the use of such a rotational force generating means is restricted in a situation where supply of electricity or fuel is difficult.

In order to solve such a problem with the rotational force generating means described above, Korean Utility Model Registration No. 199047 discloses a "Rotary Force Generator Using Spiral spring" (hereinafter, referred to as "conventional clock spring-based rotary force generator").

FIG. 11 is a cross-sectional view illustrating a process in which the conventional clock spring-based rotary force generator 100 generates a rotational force, and FIG. 12 is a perspective view viewed from a direction of A-A line of FIG. 11.

The conventional clock spring-based rotary force generator will be described below. Reference numerals 101, 102, and 103 respectively denote first, second, and third diaphragms fastened by fastening means 104 in a manner of being arranged in parallel at predetermined intervals.

An input shaft 105 is coupled with and is installed to pass through the first, second and third diaphragms 101, 102 and 103 in a rotatable manner. One end portion of the input shaft 105 protrudes outward from an outer surface of the first diaphragm 101 and a leading end surface of the end portion is a flat surface serving as a rotary means coupling portion 105a.

A spiral spring 106 is spirally wound around a portion of the input shaft 105 disposed between the first diaphragm 101 and the second diaphragm 102. An inner end of the reel sparing 106 is fixed to the outer circumferential surface of the input shaft 105 and an outer end of the reel sparing 106 is fixed to one of the fastening means 104 that respectively fasten the first diaphragm 101 and the second diaphragm 102.

A main drive gear 107 is slidably coupled with a portion of the input shaft 105 between the second diaphragm 102 and the third diaphragm 103 and a ratchet wheel 108 is fixed to one side of the main drive gear 107.

A rotary plate 109 is fixed to a portion of the input shaft 105 at a position close to the ratchet wheel 108, and an outer end of a stopper plate 110 is fixed to the rotary plate 109. An inner end of the stopper plate 110 is resiliently inserted into a space (valley) between the teeth (ridges) of the ratchet wheel 108.

In the case of the configuration described above, in a state where the input shaft 105 is rotated in the counterclockwise direction (i.e., to the left side), the inner end of the stopper plate 110 slides out of the space between the teeth of the ratchet wheel 108 and thus the turning force of the input shaft 105 is not transmitted to the main drive gear 107. Conversely, in a state where the input shaft 105 is rotated in the clockwise direction, the inner end of the ratchet wheel 108 is locked in the space between the teeth of the ratchet wheel 108 and thus the turning force of the input shaft 105 can be transmitted to the main drive gear 107.

The rotational force of the main drive gear 107 is doubled by first and second speed gears 111 and 112, and the doubled rotational force can be output via an output shaft 112a that is installed to rotatably fasten the second speed gear 112. On the other hand, the rotation speed of the output shaft 112a is controlled to be constant by a rotation speed control means 113.

The rotation speed control means 113 includes a speed gear 113a meshed with the second speed gear 112, a ratchet wheel 113b rotated by the speed gear 113a, a pendulum plate 113c rotatably mounted in the vicinity of the ratchet wheel 113b, and a pair of stopper pins 113d fixed to the pendulum plate 113c and inserted into each of the valleys of the ratchet wheel 113b, sequentially.

The rotation speed control means 113 controls the rotation speed of the output shaft 112a to be constant in such a manner that the pair of stopper pins 113d sequentially slide along the tooth surface of each tooth to enter the next valley of the ratchet wheel 113b that rotates in conjunction with the output shaft 112a for every tooth of the ratchet wheel 113b one after another.

In the case of generating a rotational force with the conventional clock spring-based rotary force generator, the input shaft 105 is rotated counterclockwise in a state where a rotary shaft (not illustrated) is coupled with the rotary means coupling portion 105a of the input shaft 105.

During the rotation of the input shaft 105, the rotational force of the input shaft 110 is not transmitted to the main drive gear 107 because the inner end of the stopper plate 110 is in the middle of sliding along the tooth surface of the ratchet wheel 108. Due to the rotation of the input shaft 105, the spiral spring 106 is wound around the input shaft 105 so that the elastic rotational force is accumulated.

In a state in which an external force is not applied to the input shaft 105 during the rotation of the input shaft 105, since the inner end of the stopper plate 110 is locked by the teeth of the ratchet wheel 108, there is no possibility that the input shaft 105 is rotated in the reverse direction by the elastic force of the spiral spring 106.

When the external force applied to the input shaft 105 is removed after the input shaft 105 is rotated by a rotary means by a predetermined number of revolutions as described above, the input shaft 105 is rotated in the reverse direction in conjunction with the main drive gear 107 by the elastic rotational force accumulated in the spiral spring 106 because the inner end of the stopper plate 110 is locked by the teeth of the ratchet wheel 108. Therefore, the rotational force of the main drive gear 107 is increased while being transmitted via the first and second speed gears 111 and 112 and thus the increased rotational force is output via the output shaft 112a.

Accordingly, the conventional clock spring-based rotary force generator 100 is widely used because it can generate rotational force for a considerable period of time even under a condition where supply of fuel or electricity is difficult.

However, the conventional clock spring-based rotary force generator 100 has a problem that the rotation speed (revolutions per minute (RPM)) of the output shaft cannot be adjusted.

The clock spring-based rotary force generator 100 has another problem that, in the second half period of a full operation span of the output shaft, the unwinding rotational force decreases due to the inherent nature of a spiral spring and thus the rotational force of the output shaft decreases, resulting in the output shaft rotating slowly or even stopping.

DISCLOSURE

Technical Problem

Accordingly, the present invention has been made to solve the problems occurring in the related art, and an object of the present invention is to provide a rotational force generating device using a clock spring, the device being capable of allowing a user to freely adjust the rotation speed (revolutions per minute (RPM)) of an output shaft, preventing the output shaft from rotating slowly or stopping in the second half period of a full operation span due to a decrease in the unwinding rotational force of the clock spring, and transmitting an almost constant rotational force for the entire operation span.

Another object of the present invention is to provide a rotational force generating device using a clock spring, the device being configured in such a manner that a pressing force applied to the circumferential surface of an input shaft is precisely adjusted by finely rotating an adjustment bolt left and right in a process of adjusting the rotation speed (RPM) of the output shaft so that the rotation speed of the output shaft can be finely adjusted.

A further object of the present invention is to provide a rotational force generating device using a clock spring, the device including a brake member constituting an output rotation speed adjusting means, in which an input shaft contact recess of the brake member is covered with a synthetic resin coating layer, thereby reducing noise when a metallic input shaft is rotated while being in contact with the input shaft contact recess of the brake member.

Technical Solution

In order to accomplish the objects of the present invention, there is provide a rotational force generating device using a clock spring, the device including: an input shaft; a main drive gear receiving the rotational force of the input shaft; a spiral spring wound around a main drive gear shaft, fixed to a circumferential surface of the main drive gear shaft at an inner end thereof and fixed to a predetermined position at an outer end thereof; a speed gear installed under the main drive gear so as to increase a rotational force of the main drive gear; a power transmission control gear sliding up and down to control transmission of the rotational force to the speed gear, depending on a rotation direction of the main drive gear while being meshed with the main drive gear; an output shaft configured to output the rotational force increased by the speed gear; and a rotation speed control means for controlling a rotation speed (revolutions per minute (RPM)) of the output shaft to be constant, in which the rotational force generating device operates such that an elastic rotational force accumulated in a spiral spring by rotating the input shaft with an external force and the output shaft is rotated by the elastic rotational force accumulated in the spiral spring when the external force applied to the input shaft is removed, in which an output RPM adjusting means for adjusting an RPM of the input shaft through external operation to adjust an RPM of the output shaft during a process in which the rotational force of the spiral spring is transmitted to the output shaft is provided on one side of the input shaft.

The output RPM adjusting means of the rotational force generating device according to the present invention includes: a horizontal fixed pipe positioned a distance apart from one side of the input shaft, installed to pass through a casing, and provided with a tap portion at an external surface thereof; an RPM adjusting member inserted in the horizontal fixed pipe to be horizontally movable and having an outer end coming into tight contact with a circumferential surface of the input shaft; a spring installed inside the horizontal fixed pipe and outside the RPM adjusting member; and an adjustment bolt coupled with the tap portion in a manner of being movable left and right so as to adjust an elastic resilient force of the spring to adjusting a pressing force of the RPM adjusting means, and provided with a turning knob.

In order to accomplish the objects of the present invention, there is provided a rotational force generating device using a clock spring, the device including: an input shaft; a main drive gear receiving a rotational force from the input shaft; a spiral spring wound spirally wound around an outer circumferential surface of a main drive gear shaft, fixed to the outer circumferential surface of the main drive gear shaft at an inner end thereof, and fixed to a predetermined position at an outer end thereof; a speed gear installed under the main drive gear and configured to increase a rotational force of the main drive gear; a power transmission control gear for controlling transmission of the rotational force of the main drive gear to the speed gear by sliding along up and down depending on a rotation direction of the main drive gear while being meshed with the main drive gear; an output shaft configured output the rotational force increased by the speed gear; a rotation speed control means configured to control a rotation speed of the output shaft to be constant, in which the rotational force generating device operates such that an elastic rotational force is accumulated in a spiral spring when the input shaft is rotated and the output shaft is rotated by the elastic rotational force accumulated in the spiral spring when an external force applied to the input shaft is removed, in which the rotational force generating device further includes an operable time indicating means connected with the input shaft so as to work in conjunction with the input shaft and configured to indicate a possible rotation time of the output shaft, the operable time indicating means including: a reduction gear for reducing a rotation speed by being meshed with the input shaft; a dial having a surface on which characters indicating hours, minutes, or seconds are marked; and an indicating needle pointing at any one of the characters, in which the rotational force generating device further includes a rotary shaft that works in conjunction with the indicating needle and a rotational force supplementing means provided between the rotary shaft and the input shaft and configured to accumulate a manually-generated initial rotational force of the input shaft and to supplement an unwinding rotational force of the spiral spring by transmitting the accumulated initial rotational force to the input shaft in a second half period of an operation span during which the unwinding rotational force of the spiral spring is reduced during rotation of the output shaft.

The rotational force supplementing means of the rotational force generating device according to the present invention includes: a circular plate mounted on the rotary shaft that works in conjunction with the indicating needle; a projection cam provided at an outer periphery of the circular plate and configured to project during the second half period of the operation span; an auxiliary gear receiving the rotational force of the input shaft; and an rotational force supplementing member receiving and accumulating the manually-generated initial rotational force of the input shaft and transmitting the accumulated initial rotational force to the input shaft during the second half period of the operation span during which the unwinding rotational force of the spiral spring is reduced.

Advantageous Effects

As described above, according to the present invention, the RPM of the output shaft can be freely adjusted by a user. Therefore, when the present invention is applied to rotary food-roasting devices, the RPM of the output shaft can be adjusted according to the kind of food so as to prepare more deliciously cooked food. In addition, the present invention has an advantage of providing a rotational force generating device using a clock spring, the device being configured in such a manner that it is possible to prevent the output shaft thereof from rotating slowly or stopping due to weakening of the unwinding rotational force of the spiral spring in the second half period of the operation span of the output shaft. Therefore, a constant unwinding force can be transmitted to the output shaft during both the first half period and the second half period of the operation span. That is, the strong output rotational force can be maintained even during the second half period of the operation span.

In addition, according to the present invention, it is possible to finely adjust the RPM of the output shaft by finely adjusting the pressing force applied to the circumferential surface of the input shaft by rotating the adjustment bolt by a fine interval in the process of adjusting the RPM of the output shaft. Therefore, when the present invention is applied to rotary food-roasting devices, more delicious food can be prepared.

In addition, according to the present invention, the rotational force generating device using a clock spring includes the synthetic resin coating layer formed on the surface of the input shaft contact recess of the brake member constituting the output RPM adjusting means. Therefore, when the metallic input shaft is rotated while being in contact with the brake member, the coating layer reduces noise during the rotation of the input shaft.

DESCRIPTION OF DRAWINGS

FIG. 9 illustrates a clock spring-based rotational force generating device according to another embodiment of the present invention, in which

FIG. 10 is a view illustrating a clock spring-based rotational force generating device according to a further embodiment of the present invention;

BEST MODE

Mode for Invention

Hereinafter, the best mode of the present invention will be described with reference to the accompanying drawings. It should be noted that the present invention can be implemented in various different forms and is thus not limited to the best mode.

Figure 1:
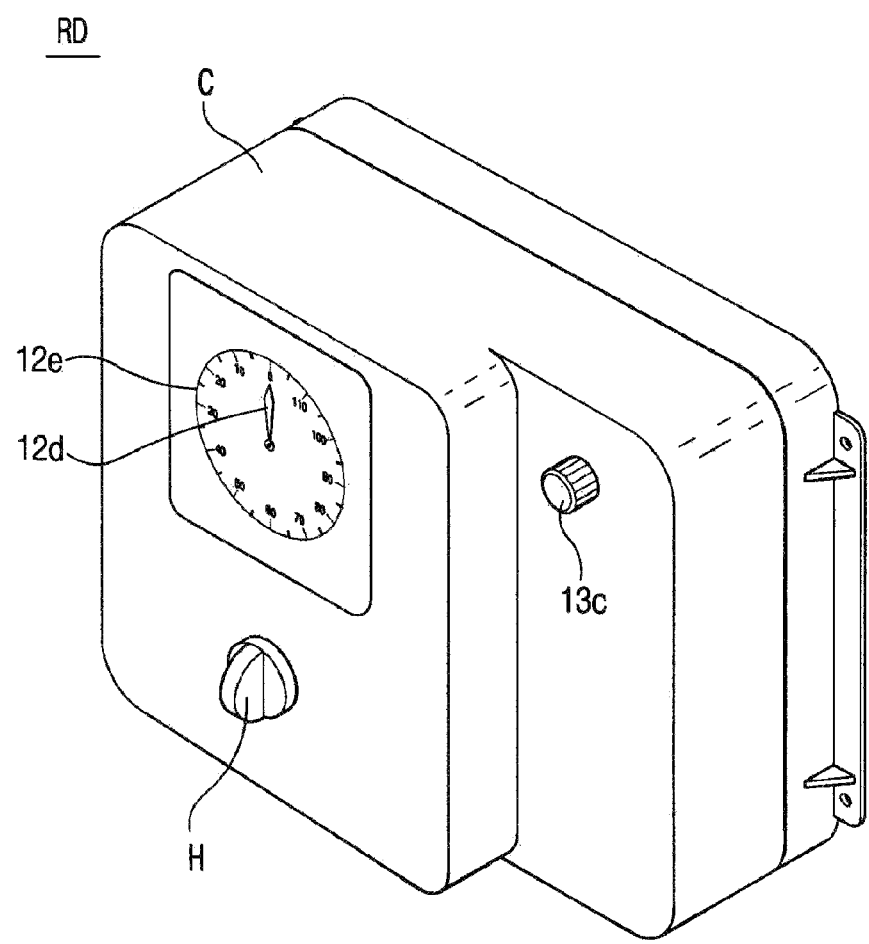
FIG. 1 is a perspective view illustrating an assembled state of a rotational force generating device using a clock spring (hereinafter, simply referred to as a clock spring-based rotational force generating device), according to the present invention.
Figure 2:
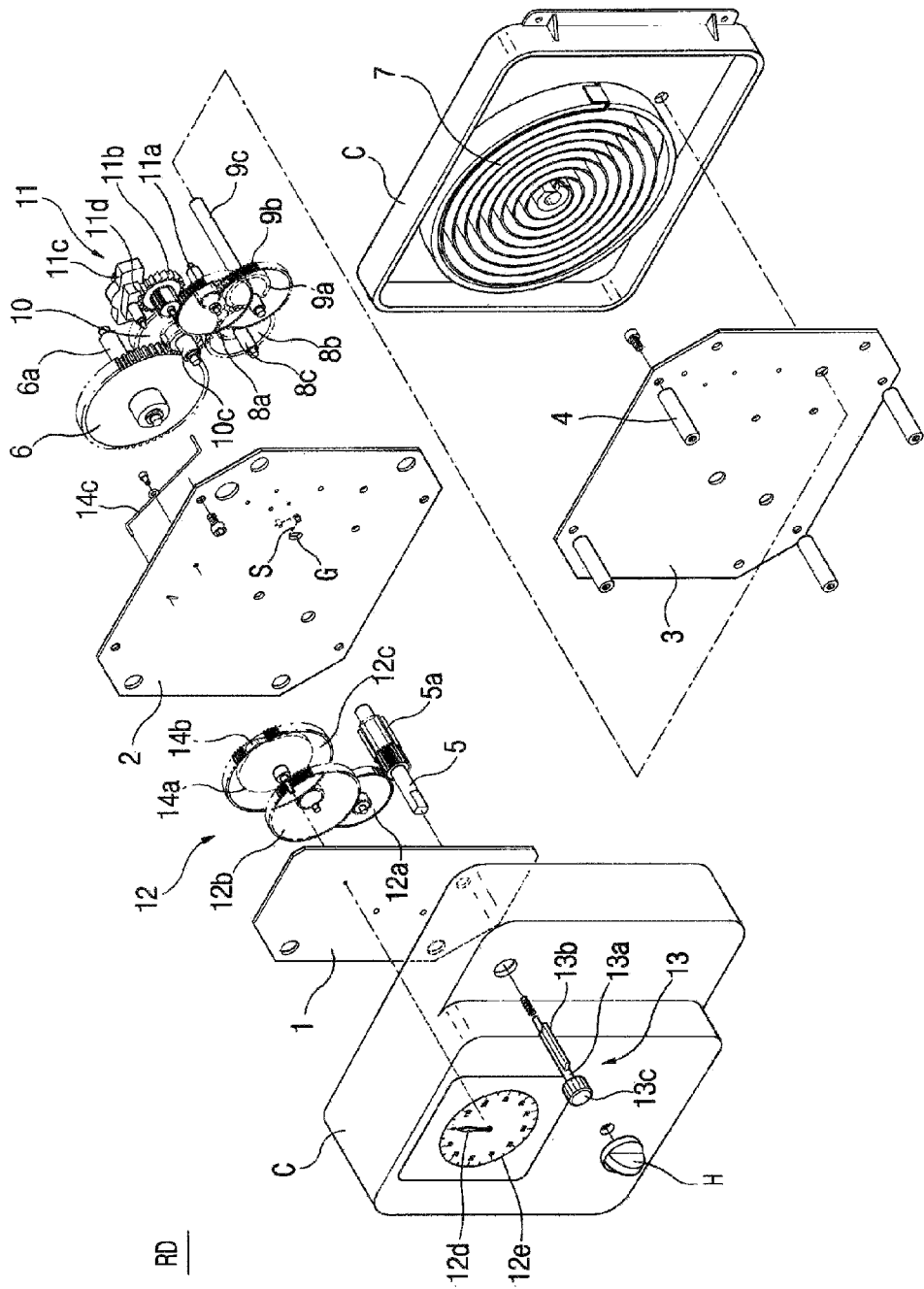
FIG. 2 is an exploded perspective view illustrating the clock spring-based rotational force generating device according to the present invention.
Figure 3:
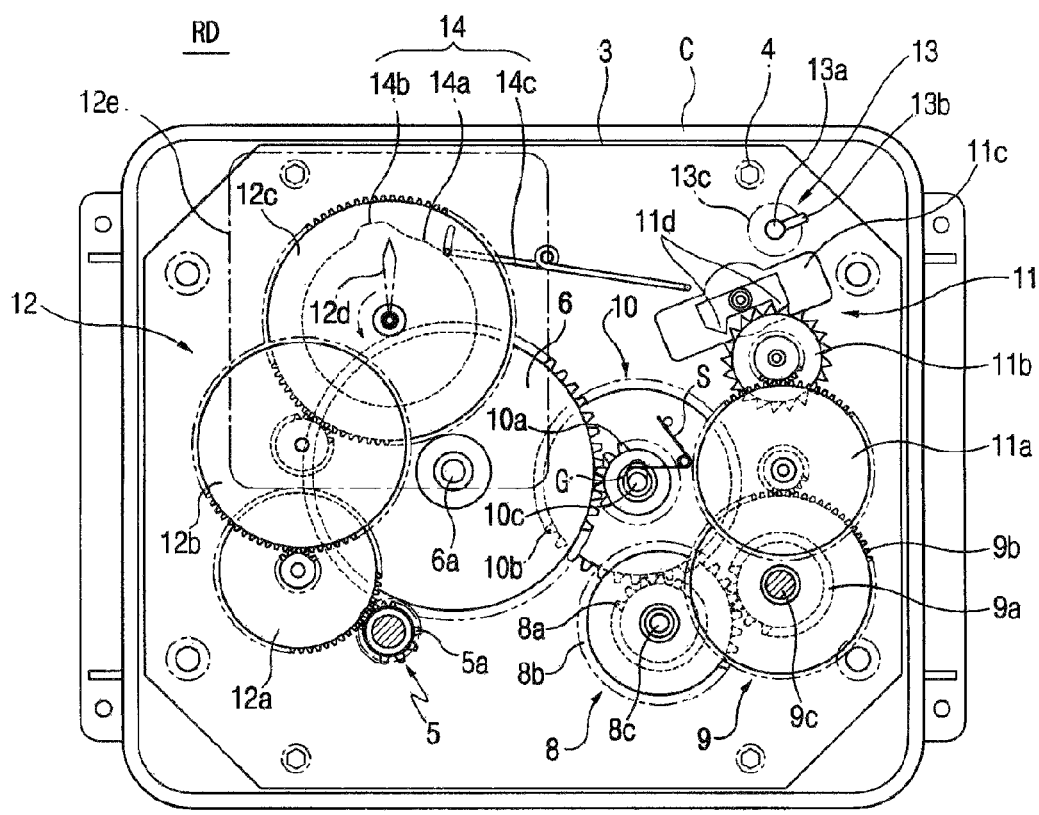
FIG. 3 is a front view illustrating the clock spring-based rotational force generating device according to the present invention.

FIG. 1 is an assembled perspective view of a rotational force generating device using a clock spring (hereinafter, referred to as a clock-spring based rotational force generating device) according to the present invention, FIG. 2 is an exploded perspective view of the clock spring-based rotational force generating device according to the present invention, and FIG. 3 is a front view of the clock spring-based rotational force generating device according to the present invention.

Reference characters 1, 2, and 3 respectively denote first, second, and third diaphragms fastened by a plurality of fastening means in a manner of being arranged at predetermined intervals. The first, second, and third diaphragms 1, 2, and 3 are accommodated in a casing C.

An input shaft 5 is rotatably coupled with the first, second, and third diaphragms 1, 2 and 3 while passing through the first, second, and third diaphragms 1, 2, and 3. One end portion of the input shaft 105 protrudes outward from an outer surface of the first diaphragm 101 and a small gear 5*a* is coupled to a portion of the input shaft 5 between each of the first, second, and third diaphragms 1, 2, and 3.

Reference character H denotes a turning knob coupled to the front end of the input shaft 5 protruding outward from an outer surface of the casing C. The turning knob is provided to manually rotate the input shaft 5.

A main drive gear 6 is rotatably mounted on a main drive gear shaft 6a between the second diaphragm 2 and the third diaphragm 3. The main drive gear shaft 6a is installed to protrude outward from an outer surface of the third diaphragm 3. The main drive gear 6 meshes with the small gear 5a.

A spiral spring 7 is spirally wound around an outer circumferential surface of a portion of the main drive gear shaft 6a which protrudes from the outer surface of the third diaphragm 3. The inner end of the spiral spring 7 is fixed to the outer circumferential of the main drive gear shaft 6a and the outer end of the spiral spring 7 is fixed to an inner portion of the casing C.

With the above-described structure, in a state in which the input shaft 5 is rotated in a direction (hereinafter, referred to as a winding direction) in which the spiral spring 7 is wound, the rotational force of the input shaft 5 is transmitted to the small gear 5a engaged with the input shaft 5, the main drive gear 6, and the spiral spring 7. Thus, the elastic rotational force of the spiral spring 7 is accumulated in the spiral spring 7. When an external force applied to the input shaft 5 is removed after the input shaft 5 is rotated, the main drive gear 6 and the input shaft 5 rotate in the reverse direction due to the elastic rotational force of the spiral spring 7.

A first speed gear 8 composed of a small gear 8a and a large gear 8b is positioned a predetermined distance apart from the main drive gear 6 and disposed between the second diaphragm 2 and the third diaphragm 3. The first speed gear 8 is rotatably mounted on a gear shaft 8c. A second speed gear 9 composed of a small gear 9a and a large gear 9b is disposed in the vicinity of the first speed gear 8 and between the second diaphragm 2 and the third diaphragm 3. The second speed gear 9 is rotatably mounted on an output shaft 9c. The output shaft 9c of the second speed gear 9 protrudes outward from the outer surface of the third diaphragm 3, and the small gear 9a of the second speed gear 9 meshes with the large gear 8b of the first speed gear 8.

A power transmission control gear 10 composed of a small gear 10a and a large gear 10b is rotatably mounted on a gear shaft 10c and is disposed between the main drive gear 6 and the first speed gear 8. Here, the gear shaft 10c is vertically movable along an arc-shaped guide groove G formed between the second diaphragm 2 and the third diaphragm 3, and a downward elastic force is applied to the gear shaft 10c by a spring S. The small gear 10a meshes with the main drive gear 6 and the large gear 10b meshes with the small gear 8a of the first speed gear 8. Here, it is preferable that the spring S has enough elastic force to withstand and support the weight of the power transmission control gear 10. The reason of setting the elastic force of the spring S to that range is to prevent the power transmission control gear 10 from sliding down along the guide groove G due to its weight, which results in the power transmission control gear 10 being unable to mesh with the first speed gear in a state in which the clock spring-based rotational force generating device according to the present invention is inclined or inverted.

Figure 4:
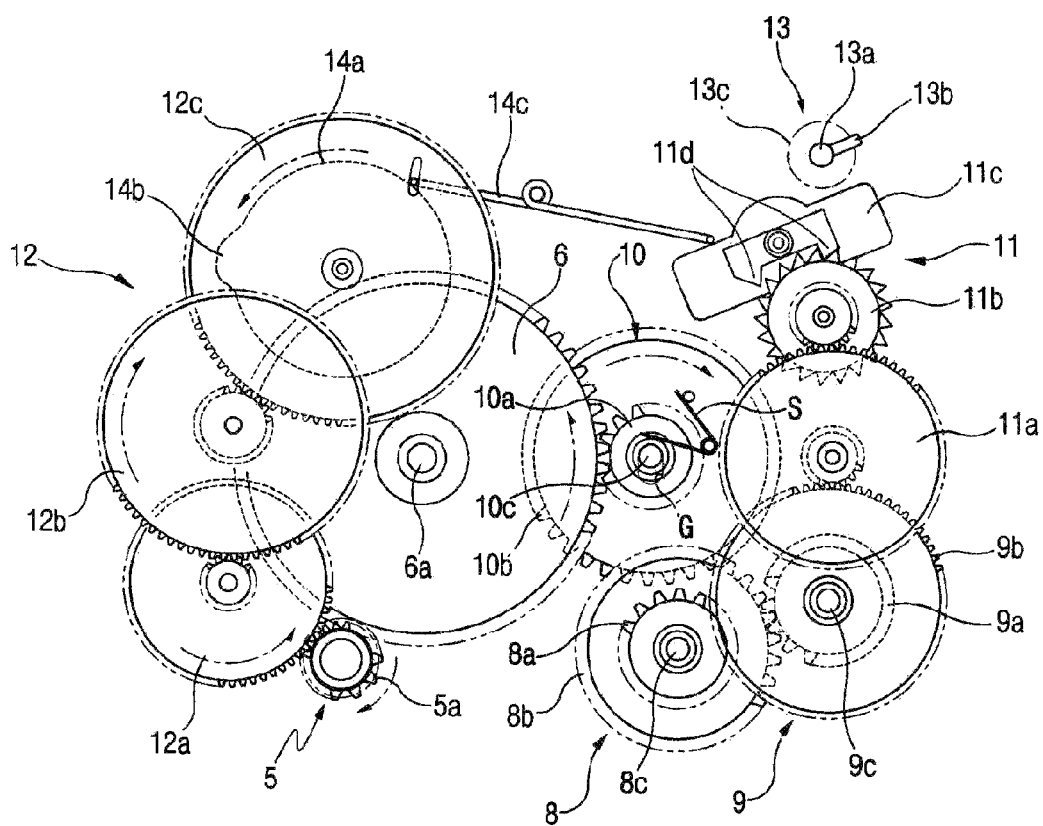
FIG. 4 is a front view illustrating a process of imparting a rotational force to a spiral spring by using an external force, in the clock spring-based rotational force generating device according to the present invention.

When the input shaft 5 is rotated by an external force in the direction in which the spiral spring 6 is wound, as illustrated in FIG. 4, the gear shaft 10c of the power transmission control gear 10 slides up along the guide groove G due to the rotational moment of the main drive gear 6.

In this state, the small gear 10a of the power transmission control gear 10 rotates while being in mesh with the main drive gear 6, and the large gear 10b slides to be unmeshed from the small gear 8a of the first speed gear 8. Therefore, the rotational force of the input shaft 5 is transmitted only to the spiral spring 7 but is not transmitted to the output shaft 9c.

Figure 5:
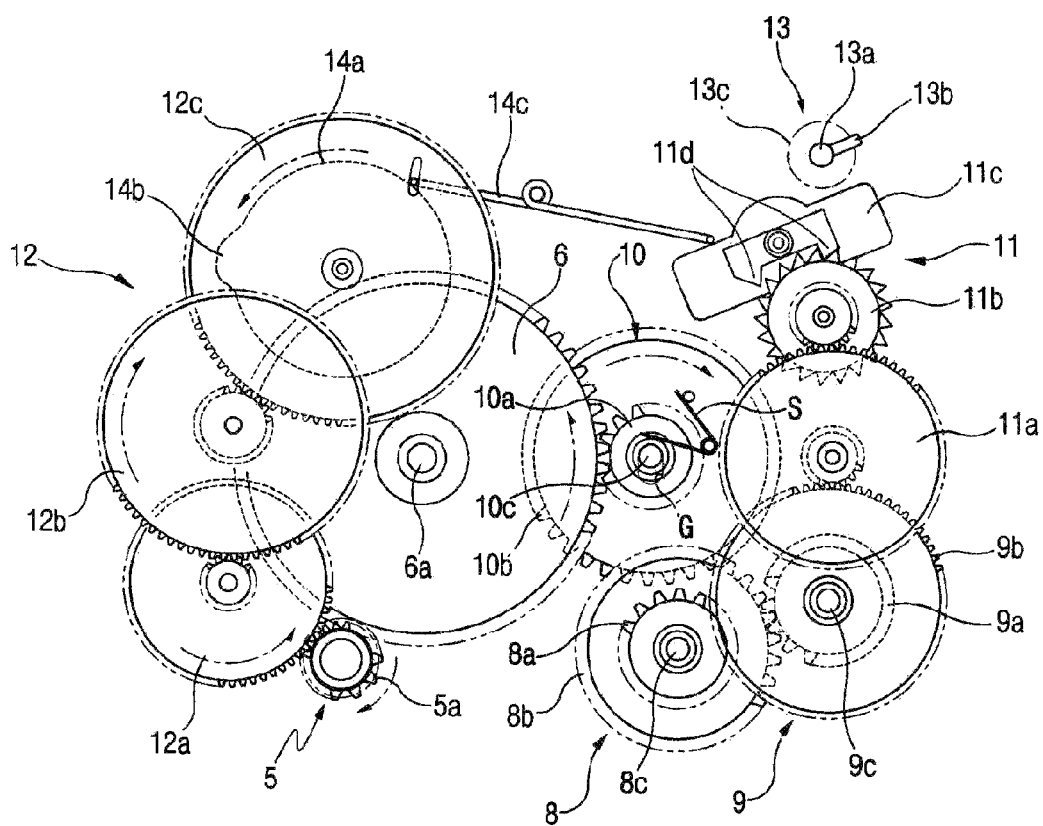
FIG. 5 is a front view illustrating an operation state in which an external force is removed from the clock spring-based rotational force generating device according to the present invention.

When the external force applied to the input shaft 5 is removed, as illustrated in FIG. 5, the gear shaft 10c of the power transmission control gear 10 slides down along the guide groove G due to the reverse rotational moment of the main drive gear 6 which is rotated by the elastic rotational force of the spiral spring 7. At this time, the power transmission control gear 10 rotates in a state where the small gear 10a of the power transmission control gear 10 is in mesh with the main drive gear 6 and the large gear 10b is in mesh with the small gear 8a of the first speed gear 8, so that the rotational force of the spiral spring 7 is transmitted to the output shaft 9c via the main drive gear 6, the power transmission control gear 10, and the first and second speed gears 8 and 9.

Therefore, although the clock spring-based rotational force generating device according to the present invention is inclined or inverted during a period in which the elastic rotational force of the elastic spring S is transmitted to the gear shaft 9c, the state in which the gear shaft 10c of the power transmission control gear 10 is maintained at a shifted position in the guide groove G toward the first speed gear 8. Therefore, no problems occur during transmission of the rotational force to the gear shaft 10c through the power transmission control gear 10.

The rotation of the output shaft 9c driven by the spiral spring 7 is maintained at a constant speed by a rotation speed control means 11.

Figure 6:
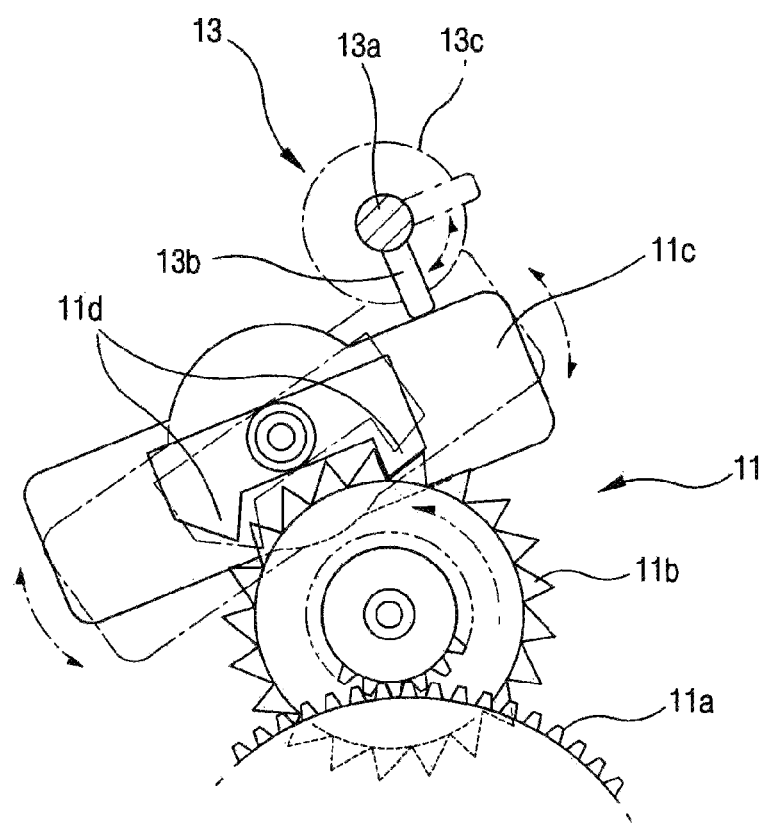
FIG. 6 is a front view illustrating a main part of a rotation speed control means according to the present invention.

As illustrated in FIGS. 5 and 6, the rotation speed control means 11 includes a speed gear 11a meshed with the second speed gear 9, a ratchet wheel 11b rotated by the speed gear 11a, a pendulum plate 113c pivotally mounted above the ratchet wheel 113b, and a pair of stopper pins 11d integrally formed at a lower end of the pendulum plate 113c in a manner of extending toward the ratchet wheel 11b. The pair of stopper pins 11d are repeatedly inserted into the valleys (spaces between teeth) of the ratchet wheel 113b, one valley after another.

The rotation speed control means 11 is configured such that the pair of stopper pins 11d slide along the tooth surface of one tooth to enter the corresponding valley (space) between the ridges (teeth) of the ratchet wheel 11b that rotates in conjunction with the output shaft 9c, thereby controlling to the rotation speed of the output shaft 9c to be constant.

A possible rotation time of the output shaft 10a is indicated by an operable time indicating means 12.

As illustrated in FIGS. 2 and 3, the operable time indicating means 12 includes: first, second, and third reduction gears 12a, 12b, and 12c that reduce the rotation speed by meshing with the small gear 5a between the first diaphragm 1 and the second diaphragm 2; a dial 12e having a surface on which characters carrying certain indication such as hours, minutes, or seconds are marked; and an indicating needle (hand) 12d provided on the front side of the casing C so as to rotate in conjunction with the third reduction gear 12c, thereby moving over the dial to point at any one of the characters on the dial.

When the input shaft 5 is rotated, the rotation speed of the input shaft 5 is reduced via the first, second, and third reduction gears 12a, 12b, and 12c before being transmitted to the indicating needle 12d, so that the indicating needle 12*d* is configured to point at one of the characters on the dial 12*e*, thereby indicating the possible operation time of the output shaft 9*a*.

The rotation of the output shaft 9*c* can be stopped by an operation stopping means 13 during the rotation of the output shaft 9*c*.

As illustrated in FIGS. 2 and 6, the operation stopping means 13 includes a pivoting shaft 13*a* pivotally coupled to the second and third diaphragms 2 and 3 and positioned above the pendulum plate 11*c*, a pushing blade 13*b* protruding from an axial surface of the pivoting shaft 13*a*, and a control knob 13*c* fixed to the front end of the pivoting shaft 13*a* in a manner of protruding forward from the front surface of the casing C.

With the configuration of the operation stopping means 13, the control knob 13*c* is turned such that the pushing blade 13*b* pushes a leading end portion of the pendulum plate 11*c* so that one stopper pin (hereinafter, referred to as a first stopper pin) 11*d* is locked in the valley of the ratchet wheel 11*b*, thereby stopping the rotation of the output shaft 9*c*. That is, it is possible to stop the rotation of the output shaft 9*c* by stopping the operation of the rotation speed control means 11 that functions to control the rotation speed of the output shaft 9*c* to be constant.

The rotation of the output shaft 9*c* is stopped at a position at which the indicating needle 12*d* of the operable time indicating means 12 is set to point at the origin (zero point) on the dial 12*e* by a zero point setting means 14.

Figure 7:
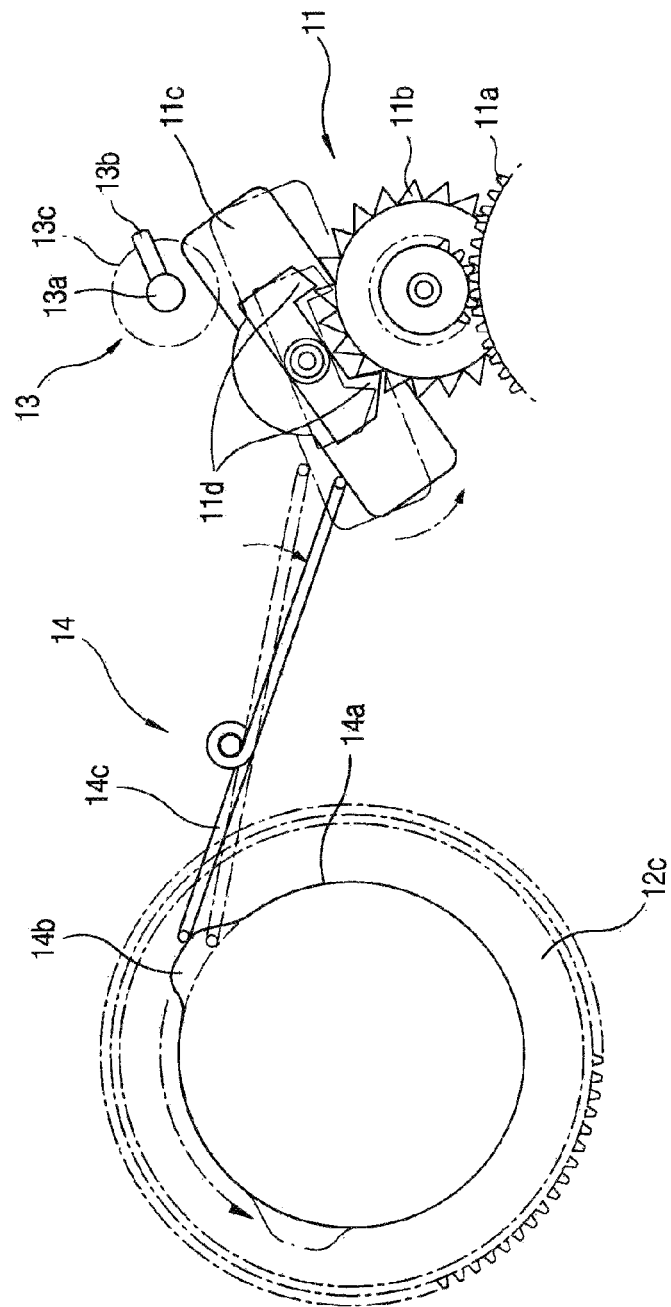
FIG. 7 is a front view illustrating a zero point setting means according to the present invention.

As illustrated in FIG. 7, the zero point setting means 14 includes a circular plate 14*a* integrally formed with a back surface of the third reduction gear 12*c* of the operable time indicating means 12, an operation activation protrusion 14*b* provided on a circumferential surface of the circular plate 14*a*, and an operation stick 14*c* having an axial first end located above the pendulum plate 11*c*, an axial middle portion rotatably installed, and an axial second end that is in elastic contact with the circumferential surface of the circular plate 14*a*.

With the configuration of the zero point setting means 14, at the position where the indicating needle 12*d* points at the zero point on the dial 12*e*, that is, in the state where the elastic rotational force of the spring 7 is lost and thus cannot be transmitted to the output shaft 9*c*, the axial first end of the operation stick 14*c* is raised by the operation activation protrusion 14*b*. When the axial second end of the operation stick 14*c* presses a second end of the pendulum plate 11*c* so that the other stopper pin (hereinafter, referred to as a second stopper pin) 11*d* can stay inserted in the valley of the ratchet wheel 11*b*, the rotation of the output shaft 9*c* is stopped.

When a rotational force is generated by the clock spring-based rotational force generating device RD according to the present invention described above, the input shaft 5 is first rotated in a direction in which the spiral spring 7 is wound.

In the state in which the input shaft 5 is rotated as described above, since the large gear 10*b* of the power transmission control gear 10 is in the middle of sliding on the small gear 8*a* of the first speed gear 8, the rotational force of the input shaft 5 is not transmitted to the output shaft 9*c* but is transmitted to the spiral spring 7 via the main drive gear 6 and the main drive gear shaft 6*a*, so that the spiral spring 6 is wound inward around the input shaft 5 and the elastic rotational force is accumulated in the spiral spring 7.

In a state in which an external force is not applied to the input shaft 5 during the rotation of the input shaft 5, there is no possibility that the elastic rotational force accumulated in the spiral spring 7 is temporarily transmitted to the output shaft 9*c*, so that the input shaft 5 is not rotated in the reverse direction by the elastic force of the spiral spring 7.

When the external force applied to the input shaft 5 is removed after the elastic force is accumulated in the spiral spring 7 as described above, the main drive gear 6 and the input shaft 5 are rotated in the reverse direction due to the elastic rotational force accumulated in the spiral spring 7. In addition, the rotational force of the main drive gear 6 is increased while being transmitted through the power transmission control gear 10 and the first and second speed gears 8 and 9, and the increased rotational force is output via the output shaft 9*c*.

In the above operation process, it is possible to check the possible rotation time of the output shaft 9*c* by looking at the time indicated by the indicating needle 12*d* on the dial 12*e*. When the elastic force of the spiral spring 7 is lost and the indicating needle 12*d* points at the zero point of the dial 12*e*, the rotation of the output shaft 9*c* is stopped by the zero point indicating means 14.

On the other hand, when it is necessary to stop the operation of the output shaft 9*c* during the rotation operation of the output shaft 9*c*, the operation of the output shaft 9*c* is stopped by turning the control knob 13*c* of the operation stopping means 13 as described above.

Figure 8:
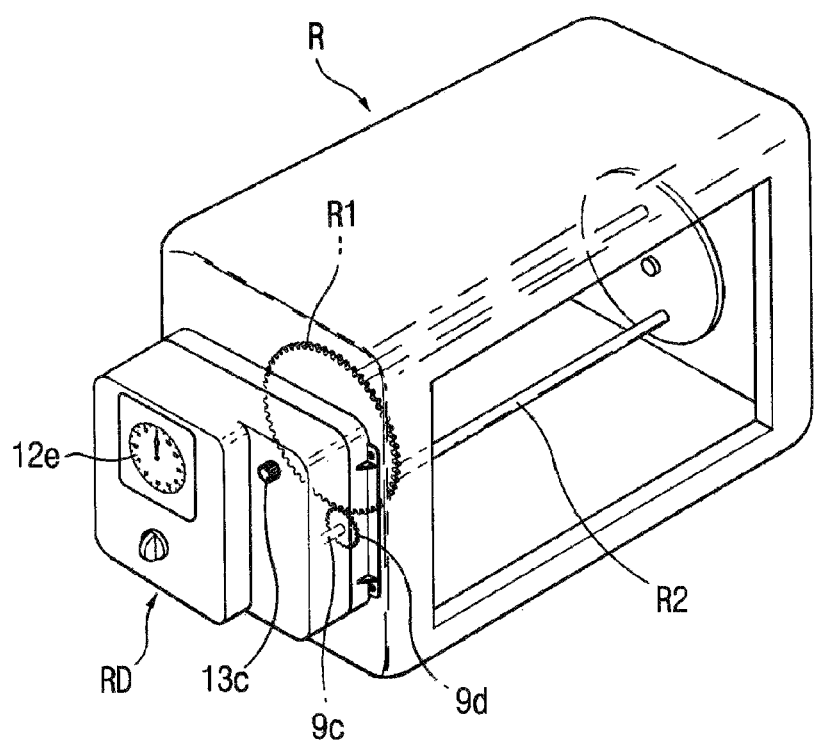
FIG. 8 is a perspective view illustrating a use state of the clock spring-based rotational force generating device according to the present invention.

For example, as illustrated in FIG. 8, the present invention described above can be applied to a powerless rotary food-roasting device R that is for outdoor use.

That is, the clock spring-based rotational force generating device according to the present invention may be installed at one side of the rotary food-roasting device R, the output gear 9*d* may be fixed to the output shaft 9*c*, and the output gear 9*d* may be meshed with the teeth of a rotary plate R1 of the rotary food-roasting device R. In this state, the rotary plate R1 of the rotary food-roasting device R can be rotated for a considerable period of time.

Then, food to be roasted may be fixed to a barbecue rod R2 of the rotary food-roasting device R in which the present invention is installed. Then, the food is rotated with the rotation of the barbecue rod R2 by the clock spring-based rotational force generating device RD and a flame is created under the rotary food-roasting device R. In this way, the food is roasted uniformly while the food is rotated in a cavity.

The configuration of the above-described rotary force generator is applied for a patent by the applicant of the present invention in Korea and is granted for a patent under Korean Patent No. 472557 titled "clock spring-based rotary force generator". The rotary force generator has a problem in that the RPM of the output shaft cannot be adjusted and the output shaft rotates slowly or never rotates in the late period of an operation span of the output shaft due to the inherent nature of a spiral spring, namely the weakening of the unwinding rotational force of the spiral spring during the late period of the operation span.

The present invention is an improvement of the rotary force generator and has solved all the problems of the rotary force generator which is registered as a Korean patent. Hereinafter, the configuration of a main part according to the present invention will be described.

Figure 9A:
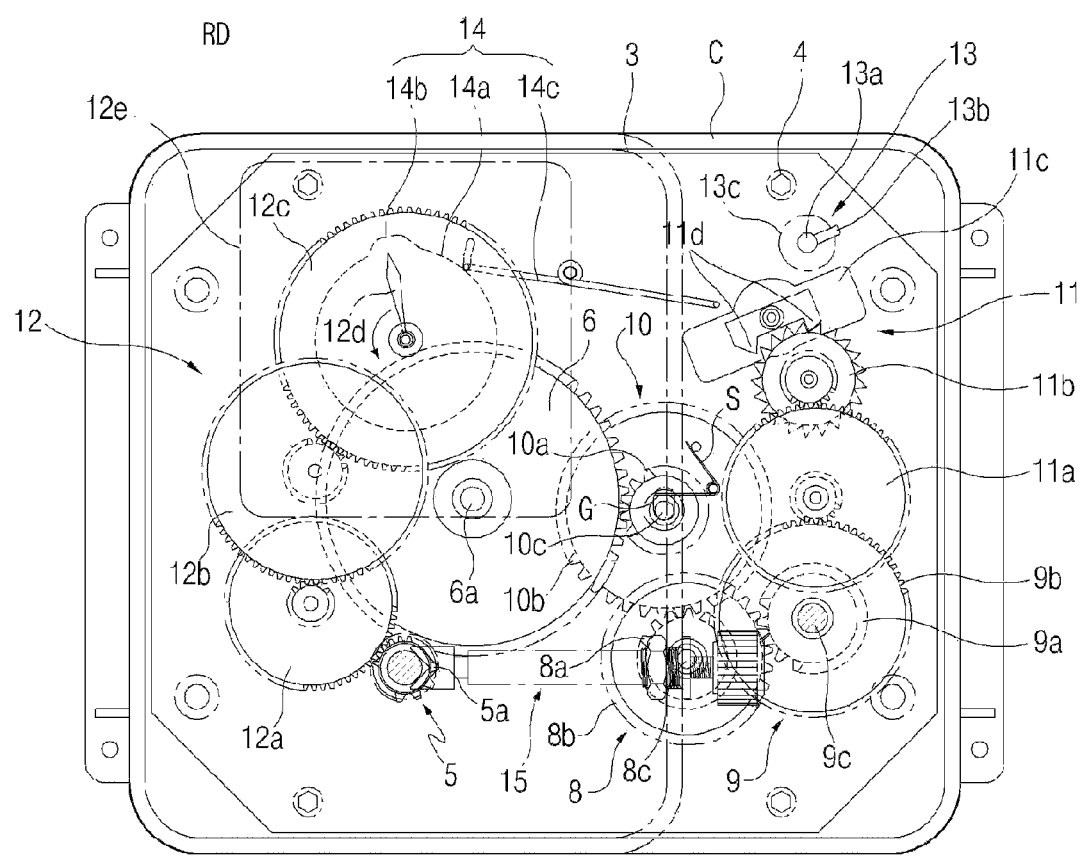
FIG. 9*a* is a schematic view and FIG. 9*b* is an enlarged view of a main part of the clock spring-based rotational force generating device.
Figure 9B:
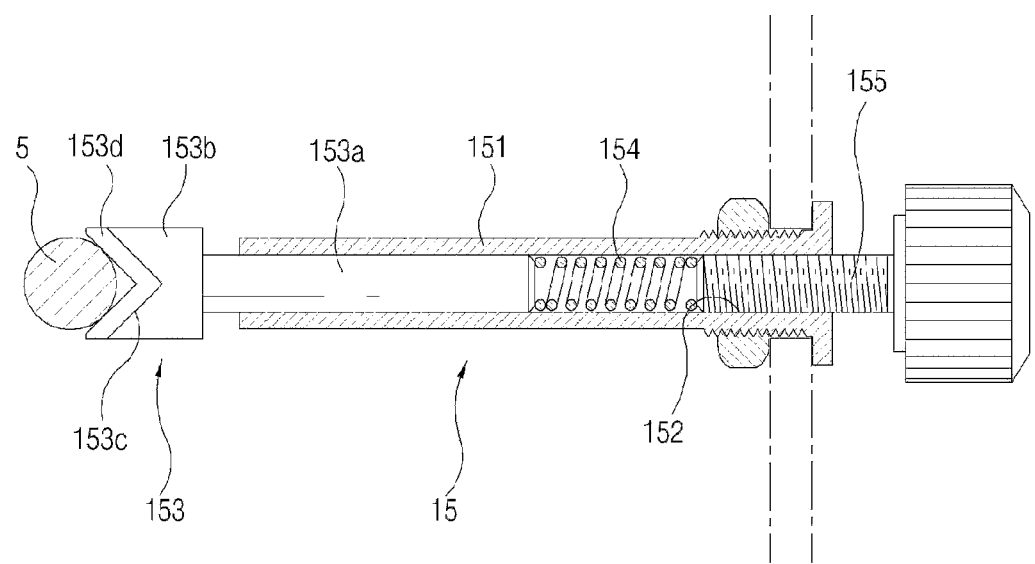
Figure 10A:
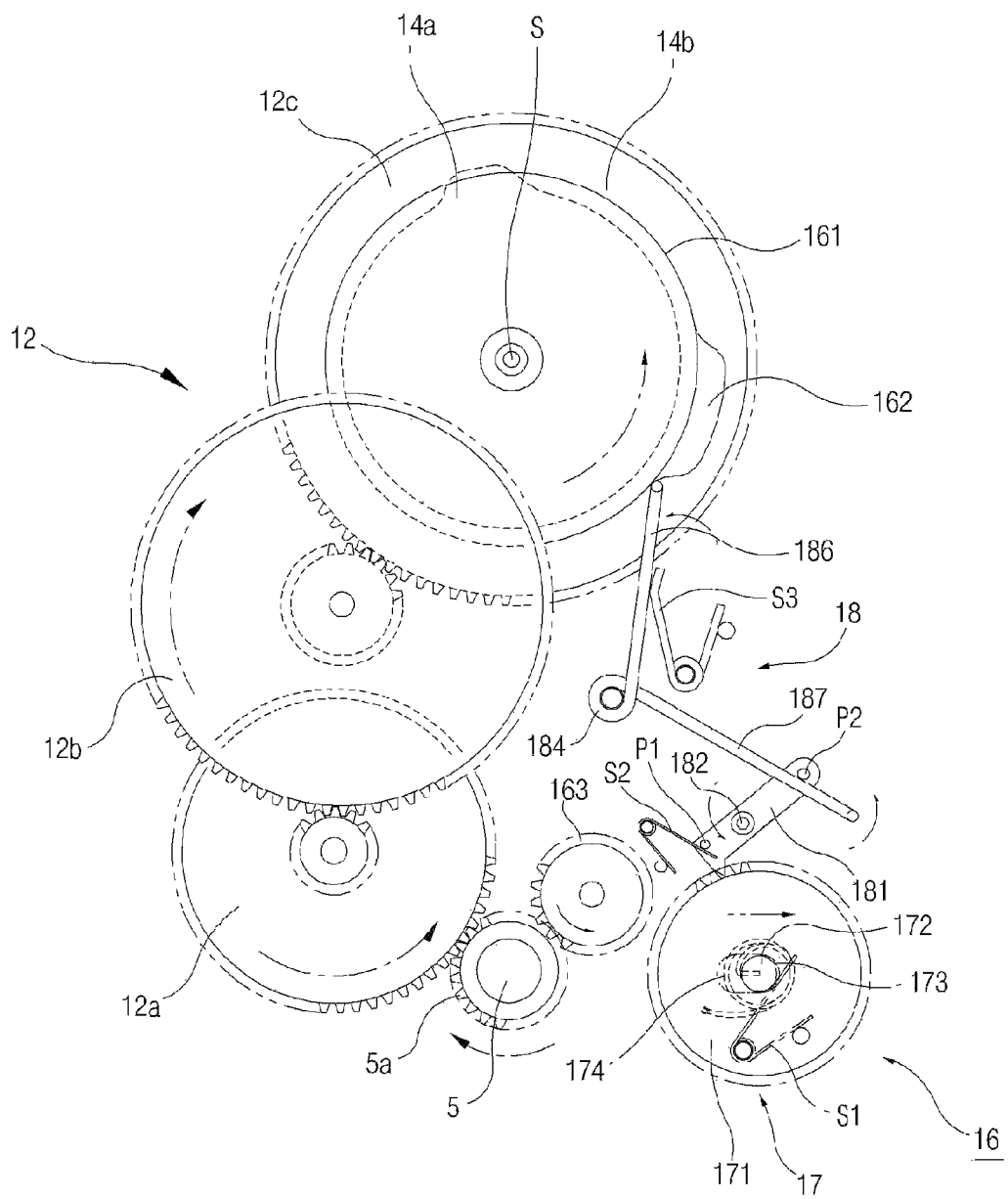
FIG. 10*a* is a schematic cross-sectional view illustrating a state in which an accumulation gear is unmeshed from an auxiliary gear and thus the operation thereof is stopped.
Figure 10B:
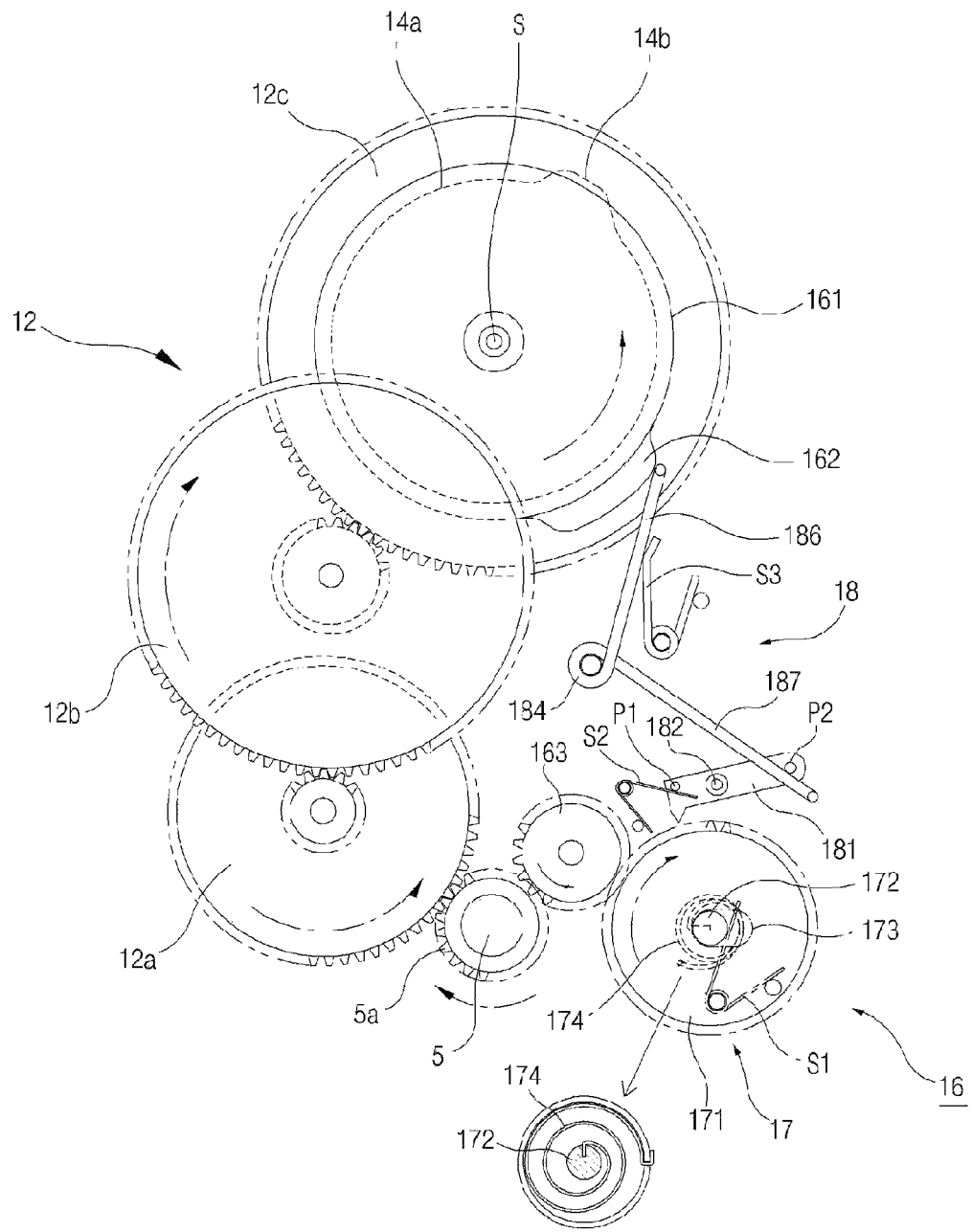
FIG. 10*b* is a cross-sectional view illustrating a state in which the accumulation gear is meshed with the auxiliary gear.
Figure 10C:
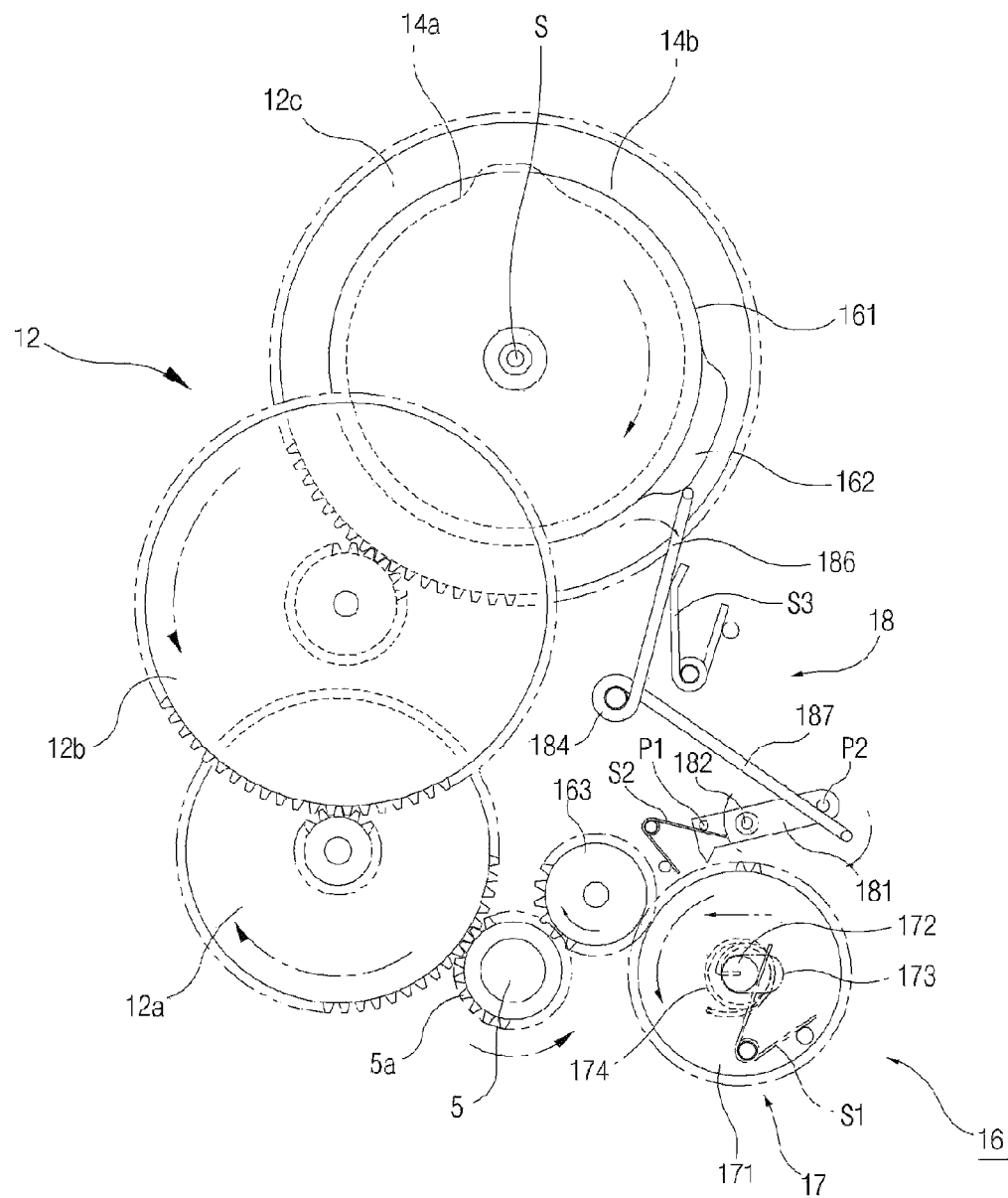
FIG. 10*c* is a cross-sectional view illustrating an operation state of an operation unit in the second half period of an operation span, in which the accumulation gear is meshed with the auxiliary gear.
Figure 11:
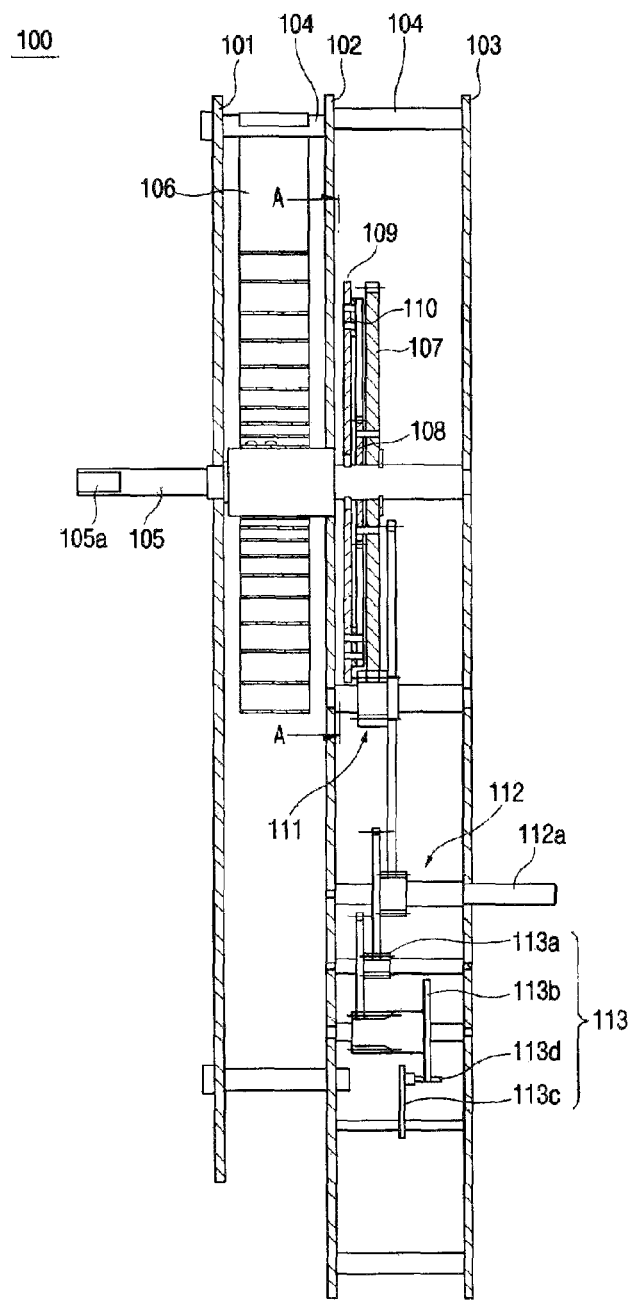
FIG. 11 is a cross-sectional view illustrating a process of generating a rotational force using a conventional clock spring-based rotary force generator.
Figure 12:
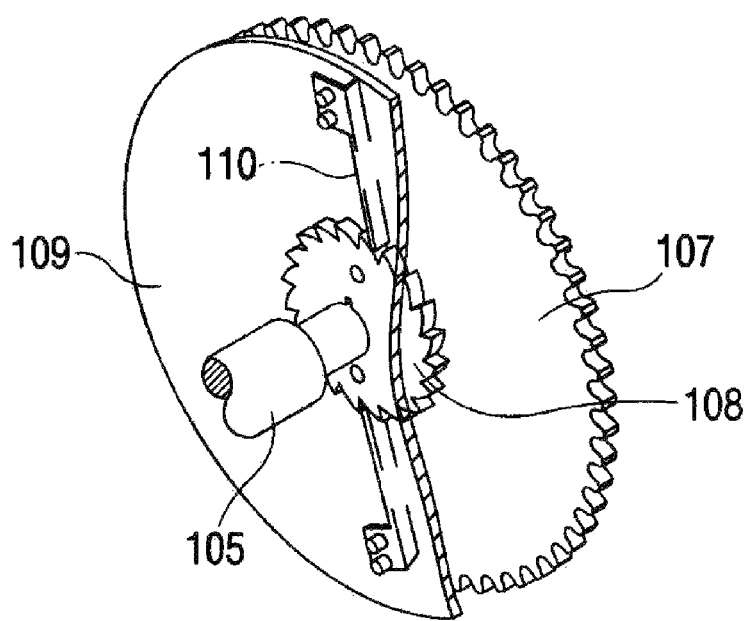
FIG. 12 is a perspective view viewed from a direction of A-A of FIG. 11.

According to the present invention, as illustrated in FIG. 9, the main part of the spiral spring-based rotational force generating device features that one side of the input shaft 5 is provided with an output RPM adjusting means 15. With the presence of the output RPM adjusting means 15, the RPM of the input shaft 5 can be adjusted through an external manipulation to adjust the RPM of the output shaft 9C in the process in which the rotational force of the spiral spring 7 is transmitted to the output shaft 9*c*.

In order to allow a user to freely adjust the rotation RPM of the output shaft, the output RPM adjusting means 15 is preferably configured to include: a horizontal fixed pipe 151 positioned a predetermined distance apart from one side of the input shaft 5, installed to extend through the casing C, and provided with a tap portion 152 at an outer portion thereof; an RPM adjusting member 153 installed in the horizontal fixed pipe 151 in a manner of horizontally movable and being in tight contact with the circumferential surface of the input shaft 5; a spring 154 disposed outside the RPM adjusting member 153 and inside the horizontal fixed pipe 151; and an adjustment bolt 155 provided with a turning knob at an outer portion thereof and fastened to the tap portion 152 in a manner of being moved leftward and rightward so that an elastic repellent force of the spring 154 can be adjusted and a pressing force of the RPM adjusting member 153 can be adjusted. Therefore, in terms of the adjustment of the RPM of the output shaft 9c, the present invention has an advantage of more finely tuning the RPM of the output shaft 9c by rotating the adjustment bolt 155 finely leftward or rightward to precisely adjust the pressing force applied to the circumferential surface of the input shaft 5.

Preferably, the RPM adjusting member 153 includes: a horizontally movable shaft 153a which is disposed in the horizontal fixed pipe 151 in a manner of being horizontally, smoothly movable; and a brake member 153b which is formed at an outer end of the horizontally movable shaft 153a and configured to press the circumferential surface of the input shaft 5 to the extent that the input shaft 5 can rotate, to change the RPM of the input shaft 5.

In addition, the outer surface of the brake member 153b is provided with an input shaft contact recess 153c tapered to the bottom so that the input shaft 5 can be firmly and stably pressed by the horizontally movable shaft 153a. Preferably, the inclined surface of the tapered input shaft contact recess 153 is coated with a synthetic resin coating layer 153d to reduce noise during the rotation of the input shaft in the input shaft contact recess. Therefore, according to the present invention, since the surface of the input shaft contact recess 153c of the brake member which is a constituent part of the output RPM adjusting means is coated with the synthetic resin coating layer 153d, in the process in which the metallic input shaft 5 rotates with the circumferential surface thereof being in tight contact with the coating layer 153d of the brake member, noise can be minimized. Therefore, the present invention has an advantage of providing a silent clock spring-based rotational force generating device.

Therefore, according to the present invention, since a user can freely adjust the RPM of the output shaft 9c with the output RPM adjusting means 15, when the present invention is applied to a rotary food-roasting device, the RPM of food can be adjusted according to the kind of food so that more delicious cooked food can be prepared.

In addition, as illustrated in FIGS. 1 to 4 and FIG. 10, the configuration of the present invention further includes a rotational force supplementing means 16 that is provided between a rotary shaft 5 that works in conjunction with the indicating needle 12d and the input shaft 5, thereby accumulating an initial rotational force of the input shaft 5 when the input shaft 5 is manually rotated in the early period of the operation span and supplementing the unwinding rotational force of the spiral spring 7 by transmitting the accumulated initial rotational force to the input shaft 5 during the late period of the operation span during which the unwinding rotational force of the spiral spring 7 decreases, during rotation of the output shaft 9c.

In order to prevent the output shaft 9c from stopping rotating due to the weakening of the rotational force of the output shaft 9c attributable to the weakening of the unwinding rotational force of the spiral spring 7 during the late period of the operation span of the output shaft 9c, it is preferable that the rotational force supplementing means 16 includes a circular plate 161 mounted on the rotary shaft 5 that works in conjunction with the indicating needle 12d, a projection cam 162 provided at an outer periphery portion of the circular plate 161 in a manner of projecting during the late period of the operation span, an auxiliary gear 163 receiving the rotational force of the input shaft 5, and a rotational force supplementing unit 17 that is provided between the auxiliary gear 163 and the circular plate 161, receives and accumulates the rotational force of the input shaft 5 during the early period of the operation span, and transmits the rotational force accumulated during the early period to the input shaft 5, in the late period of the operation span during which the unwinding rotational force of the spiral spring 7 decreases.

Preferably, the rotational force supplementing unit 17 includes: an accumulation gear 171 functioning to accumulate a rotational force and configured in a manner that a gear rotary shaft 172 thereof horizontally moves along a horizontally elongated hole 173 so as to be meshed with or unmeshed from the auxiliary gear 163; an accumulation spiral spring 174 wound around the gear rotary shaft 172, fixed to the circumferential surface of the gear rotary shaft 172 at an inner end thereof, and fixed to a predetermined position at an outer end thereof; a first spring S1 configured to press the gear rotary shaft 172 against the auxiliary gear, constantly; and an operation unit 18 that is provided between the circular plate 161 and the accumulation gear 171 and is configured to cause the accumulation gear 171 to disengage from the auxiliary gear 163 when the an upper portion thereof comes into contact with the outer circumferential surface of the circular plate 161 and to engage with the auxiliary gear 163 when the upper portion thereof comes into contact with the outer circumferential surface of the projection cam 162.

The operation unit 18 is disposed a predetermined distance apart from above the accumulation gear 171. The operation unit 18 includes: a gear disengagement stopping link 181 that is pivoted about a middle rotary shaft 182; a first pin P1 that passes through an inner end portion of the gear disengagement stopping link 181 and is raised by a second spring S2; an insertion protrusion 183 that is provided at a lower end of the inner portion of the gear disengagement stopping link 181 to be inserted into the space between the teeth of the accumulation gear 171; and a second pin P2 that passes through an outer end portion of the gear disengagement stopping link 181. The operation unit 18 further includes a rotary operation bar 184 disposed between the circular plate 161 and the gear disengagement stopping link 181 and configured to pivot about a central rotary shaft 185. The operation unit 18 further includes: an upper pressing bar 186 that is provided above the central rotary shaft 185 and which comes into contact with the outer circumferential surface of the projection cam 162 or the outer circumferential surface of the circular plate 161, depending an operation of a third spring S3; and a lower pressing bar 187 that is provided under the central rotary shaft and which presses the second pin P2 upward.

The operation unit 18 is configured in a manner that when the upper pressing bar 186 comes into contact with the outer circumferential surface of the circular plate 161, the lower pressing bar 187 is raised so that the insertion protrusion 183 of the gear disengagement stopping link 181 can be inserted into the space between the teeth of the accumulation gear 171, thereby separating the accumulation gear 171 from the auxiliary gear 163 for stopping the operation of the accumulation gear 171. On the other hand, when the upper pressing bar 186 comes into contact with the outer circumferential surface of the projection cam 162, the lower pressing bar 187 is lowered so that the insertion protrusion 183 of the gear disengagement stopping link 181 can escape the space between the teeth of the accumulation gear 171, thereby causing the accumulation gear 171 to engage with the auxiliary gear 171.

Particularly, when the indicating needle 12d points at the zero point, it is preferable that the lower end of the projection cam 162 is positioned on the upper pressing bar 186 so that the accumulation gear 171 receives and accumulates the manually-generated rotational force in the early period of the operation span and transmits the rotational force, which is accumulated during the early period to the input shaft 5, during the rotation of the output shaft 9c, particularly in the late period of the operation span during which the unwinding rotational force of the spiral spring 7 decreases.

Accordingly, the present invention is configured in a manner that when the indicating needle 12d points at the zero point, in the process in which the input shaft 5 is manually rotated so that the spiral spring 7 can be wound during the early period of the operation span in the state in which the lower end of the projection cam 162 is positioned on the upper pressing bar 186, the circular plate 161 is rotated and the upper portion of the upper pressing bar 186 is positioned on the circumferential surface of the projection cam 162. In this way, at least during the period in which the upper portion of the upper pressing bar 186 is positioned on the outer circumferential surface of the projection cam 162, as described above, the accumulation gear 171 and the auxiliary gear 163 are engaged, so that the accumulation gear 171 receives and accumulates the manually-generated rotational force of the input shaft 5 in the early period of the operation span and the accumulation spiral spring 174 wound around the gear shaft 172 of the accumulation gear 171 accumulates the rotational force.

When the projection cam 162 is rotated further in the direction in which the input shaft is manually rotated, since the upper portion of the upper pressing bar 186 is positioned on the outer circumferential surface of the circular plate 161, the accumulation gear 171 is disengaged from the auxiliary gear 163 and thus the operation of the accumulation gear 171 is stopped. Therefore, the accumulation spiral spring 174 wound around the gear rotary shaft 172 of the accumulation gear 171 stays with the rotational force accumulated therein.

On the other hand, after the spiral spring 7 is wound up and the operation span is set, in the process in which the output shaft is rotated by the unwinding force of the spiral spring 7, the circular plate 161 is rotated in the reverse direction. In the late period of the operation span during which the unwinding rotational force of the spiral spring 7 decreases, the circular plate 161 is rotated and thus the upper portion of the upper pressing bar 186 shifts to be positioned on the outer circumferential surface of the projection cam 162. As described above, during the process in which the upper portion of the upper pressing bar 168 shifts to be positioned on the outer circumferential surface of the projection cam 162, the accumulation gear 171 and the auxiliary gear 163 are engaged. Therefore, when the accumulation spiral spring 174, which is wound around the gear rotary shaft 172 of the accumulation gear 171, is unwound, the accumulated rotational force of the accumulation spiral spring 174 is transmitted to the auxiliary gear 163 via the accumulation gear 171, which is in turn transmitted to the input shaft 5. Therefore, in the late period of the operation span during which the unwinding rotational force of the spiral spring 7 decreases, since the initial rotational force accumulated in the accumulation spiral spring 174 is transmitted to the input shaft 5, the unwinding rotational force of the spiral spring 7 is supplemented in the late period of the operation span. Therefore, it is possible to prevent the rotation of the output shaft 9c from being stopped in the late period of the operation span during which the unwinding operational force of the spiral spring 7 decreases.

Accordingly, the present invention is useful in terms of preventing the output shaft 9c from unintentionally stopping due to a decrease in the rotational force of the output shaft 9c which results from a decrease in the unwinding force of the spiral spring 7 in the late period of the operation span of the output shaft 9c.

Although the best mode of the present invention has been described above, the present invention covers various changes, alterations, modifications, and equivalents thereto besides the best mode. It is clear that the present invention can be suitably modified with reference to the best mode described above to obtain the same effect. Accordingly, the above description does not limit the scope of the invention defined by the limitations recited in the following claims.

DESCRIPTION OF THE REFERENCE CHARACTERS IN THE DRAWINGS 1, 2, 3: diaphragm
4: fastening means
5: input shaft
6: drive gear
7: spiral spring
8, 9: first and second speed gears
10: power transmission control gear
11: rotation speed control means
12: operable time indicating means
13: operation stopping means
14: zero point setting means
15: output RPM adjusting means
16: rotational force supplementing means

The invention claimed is:
1. A rotational force generating device comprising:
an input shaft (5);
a main drive gear (6) receiving a rotational force from the input shaft (5);
a spiral spring (7) spirally wound around a main drive gear shaft (6a) and installed such that an inner end thereof is fixed to an outer circumferential surface of the main drive gear shaft (6a) and an outer end thereof is fixed to a predetermined position;
speed gears (8, 9) functioning to increase the rotational force of the main drive gear (6) and installed under the main drive gear (6);
a power transmission control gear (10) intermittently transmitting the rotational fore of the main drive gear (6) to the speed gears (8, 9) by vertically sliding up and down depending on rotation directions of the main drive gear 6 while being in mesh with the main drive gear 6;
an output shaft (9c) outputting the increased rotational force output from the speed gears (8, 9); and a rotation speed control means (11) for controlling a rotation speed of the output shaft (9c) to be constant, the rotational force generating device operating in a manner that an elastic rotational force of the spiral spring (7) is accumulated when the input shaft (5) is rotated by an external force and the output shaft (9c) is rotated by the elastic rotational force of the spiral spring (7) when the external force is removed, wherein an output RPM adjusting means (15) is provided on one side of the input shaft (5) in order to adjust an RPM of the output shaft (9c) by controlling an RPM of the input shaft (5) through an external manipulation, in a process in which the rotational force of the spiral sparing (7) is transmitted to the output shaft (9c), wherein the output RPM adjusting means (15) comprises:

a horizontal fixed pipe (151) spaced from one side of the input shaft (5), installed to extend through a casing (C), and provided with a tap portion (152) at an outer portion thereof;

an RPM adjusting member (153) installed in the horizontal fixed pipe (151) in a manner of being horizontally movable while being in contact with an outer circumferential surface of the input shaft (5);

a spring (154) disposed outside the RPM adjusting member (153) and inside the horizontal fixed pipe (151); and an adjustment bolt (155) fastened to the tap portion (152) in a manner of being movable leftward and rightward, configured to adjust a pressing force of the RPM adjusting member (153) by adjusting an elastic repellent force of the spring (154), and provided with a turning knob at an outer portion thereof.

2. The rotational force generating device according to claim 1, wherein the RPM adjusting member (153) comprises:

a horizontally movable shaft (153a) being movable left and right in the horizontal fixed pipe (151); and a brake member (153b) provided at an outer end of the horizontally movable shaft (153a) and configured to press an outer circumferential surface of the input shaft (5) to the extent that the input shaft (5) is rotatable, in order to adjust a rotation speed (revolutions per minute) of the input shaft (5).

3. The rotational force generating device according to claim 2, wherein an outer surface of the brake member (153b) is provided with an input shaft contact recess (153c) that is tapered to a bottom to have an inclined surface.

4. The rotational force generating device according to claim 3, wherein the inclined surface of the input shaft contact recess 153 is coated with a synthetic resin coating layer 153d to reduce noise during rotation of the input shaft.

5. A rotational force generating device comprising:

an input shaft (5);

a main drive gear (6) receiving a rotational force from the input shaft (5);

a spiral spring (7) spirally wound around a main drive gear shaft (6a), fixed to an outer circumferential surface of the main drive gear shaft (6a) at an inner end thereof, and fixed to a predetermined position at an outer end thereof;

speed gears (8, 9) installed under the main drive gear (6) to increase a rotational force of the main drive gear (6);

a power transmission control gear (10) meshed with the main drive gear (6) and configured to slide up and down depending on a rotation direction of the main drive gear (6) to intermittently transmit the rotational force of the main drive gear (6) to the speed gears (8, 9);

an output shaft (9c) configured to output the rotational force increased by the speed gears (8, 9); and a rotation speed control means (11) for controlling a rotation speed of the output shaft (9c) to be constant, the rotational force generating device operating in a manner that an elastic rotational force is accumulated in a spiral spring (7) when the input shaft (5) is rotated by an external force and the output shaft (9c) is rotated by the elastic rotational force accumulated in the spiral spring (7) when the external force applied to the input shaft (5) is removed, wherein the rotational force generating device further comprises: an operable time indicating means (12) connected to the input shaft (5) to operate in conjunction with the input shaft (5) and configured to indicate a possible operation time of the output shaft (9c), the operable time indicating means (12) including: reduction gears (12a, 12b, and 12c) meshed with the input shaft (5) in order to reduce a rotation speed of the input shaft (5); a dial (12e) with a surface on which characters representing hours, minutes, or seconds are marked at a circumferential periphery portion thereof; and an indicating needle (12d) rotating in conjunction with the reduction gears (12a, 12b, and 12c) and pointing at one of the characters, wherein the rotational force generating device further comprises a rotational force supplementing means (16) that is provided between the input shaft (5) and a rotary shaft (S) operating in conjunction with the indicating needle (12d) and which is configured to receive and accumulate a manually-generated initial rotational force of the input shaft (5) in a beginning period of an operation span of the rotational force generating device and to transmit the accumulated initial rotational force to the input shaft (5) during the rotation of the output shaft (9c) to supplement an unwinding rotational force of the spiral spring (7) in a late period of the operation span during which the unwinding rotational force of the spiral spring (7) decreases.

6. The rotational force generating device according to claim 5, wherein the rotational force supplementing means (16) comprises:

a circular plate (161) mounted on the rotary shaft (S) that operates in conjunction with the indicating needle (12d);

a projection cam (162) projecting from an outer periphery of the circular plate (161) during the late period of the operation span; an auxiliary gear (163) receiving the rotational force of the input shaft (5); and a rotational force supplementing unit (17) that is provided between the auxiliary gear (163) and the circular plate (161), receives and accumulates the manually-generated initial rotational force of the input shaft (5) during the early period of the operation span, and transmits the accumulated initial rotational force to the input shaft (5) in the late period during which the unwinding rotational force of the spiral spring (7) decreases.

7. The rotational force generating device according to claim 6, wherein the rotational force supplementing unit (17) comprises:

an accumulation gear (171) configured such that a gear rotary shaft (172) thereof horizontally moves along a horizontally elongated hole (173) so as to be meshed with or unmeshed from the auxiliary gear (163);

an accumulation spiral spring (174) wound around the gear rotary shaft (172), fixed to a circumferential surface of the gear rotary shaft (172) at an inner end thereof, and fixed to a predetermined position at an outer end thereof;
a first spring (S1) configured to constantly press the gear rotary shaft (172) against the auxiliary gear (163); and
an operation unit (18) that is provided between the circular plate (161) and the accumulation gear (171) and is configured such that the accumulation gear (171) is unmeshed from the auxiliary gear (163) when the an upper portion of the operation unit (18) comes into contact with an outer circumferential surface of the circular plate (161) and the rotational force accumulation gear (171) is meshed with the auxiliary gear (163) when the upper portion of the operation unit (18) comes into contact with an outer circumferential surface of the projection cam (162).

8. The rotational force generating device according to claim 6, wherein the operation unit (18) comprises:
a gear disengagement stopping link (181) positioned above the accumulation gear (171), configured to pivot about a middle rotary shaft (182), and including a first pin (P1) that is provided at an inner end portion thereof and which is raised by being pushed by a second spring (S2), an insertion protrusion (183) provided at a lower end of the inner portion thereof so as to be inserted into a space between teeth of the accumulation gear (171), and a second pin (P2) provided at an outer end portion thereof; and
a rotary operation bar (184) configured to rotate about a central rotary shaft (185) disposed between the circular plate (161) and the gear disengagement stopping link (181), the rotary operation bar (184) including an upper pushing bar (186) that comes into contact with an outer circumferential surface of the projection cam (162) or an outer circumferential surface of the circular plate (131) according to operations of a third spring (S3) and a lower pushing bar (187) that pushes the second pin (P2) upward.

9. The rotational force generating device according to claim 8, wherein the lower pushing bar (187) is raised so that the insertion protrusion (183) of the gear disengagement stopping link (181) is inserted into the space between the teeth of the accumulation gear (171) and thus the accumulation gear (171) is unmeshed from the auxiliary gear (163) when the upper pushing bar (186) comes into contact with the outer circumferential surface of the circular plate (161), and conversely the lower pushing bar (187) is lowered so that the insertion protrusion (183) of the gear disengagement stopping link (181) escapes the space between the teeth of the accumulation gear (171) and thus the accumulation gear (171) is meshed with the auxiliary gear (163) when the upper pushing bar (186) comes into contact with the outer circumferential surface of projection cam (162).

10. The rotational force generating device according to claim 8, wherein when the indicating needle (12*d*) points at a zero point, a lower portion of the projection cam (162) is positioned on the upper pushing bar (186).

* * * * *